R. E. RIDAY.
ANIMAL TRAP.
APPLICATION FILED APR. 20, 1909.

973,213.

Patented Oct. 18, 1910.

WITNESSES
E. M. Ware
[signature]

INVENTOR
Robert E. Riday
by A. V. [signature]
ATTORNEY

THE NORRIS PETERS CO., WASHINGTON, D. C.

UNITED STATES PATENT OFFICE.

ROBERT E. RIDAY, OF DARBY, PENNSYLVANIA.

ANIMAL-TRAP.

973,213.   Specification of Letters Patent.   Patented Oct. 18, 1910.

Application filed April 20, 1909. Serial No. 491,086.

*To all whom it may concern:*

Be it known that I, ROBERT E. RIDAY, citizen of the United States, residing at Darby, in the county of Delaware and State of Pennsylvania, have invented certain new and useful Improvements in Animal-Traps, of which the following is a specification.

This invention relates to animal traps.

The object of my invention is to provide a trap of novel, simple and efficient construction, having provision whereby the jaws of an animal seeking bait within the trap may be closed and retained in the closed position upon a bar adapted to engage the front teeth of the animal, in a manner to prevent the animal from freeing itself from the trap.

With this object in view, the invention consists in the novel construction and combinations of parts which will be hereinafter fully described and claimed.

Figure 1:
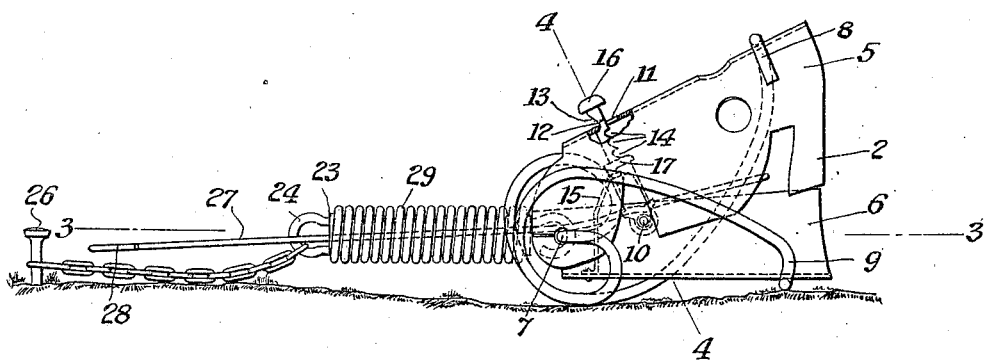
Figure 2:
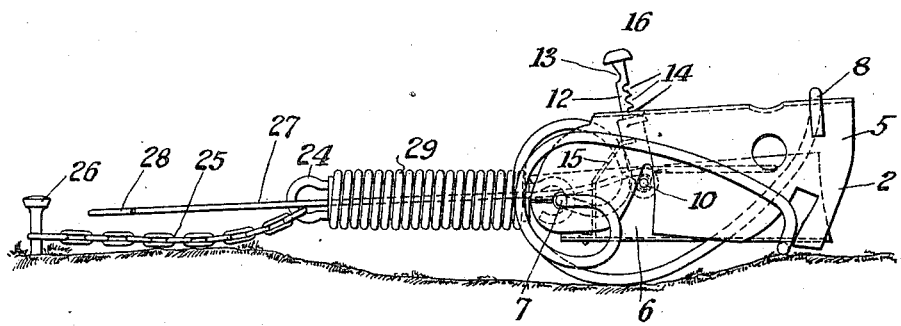
Figure 3:
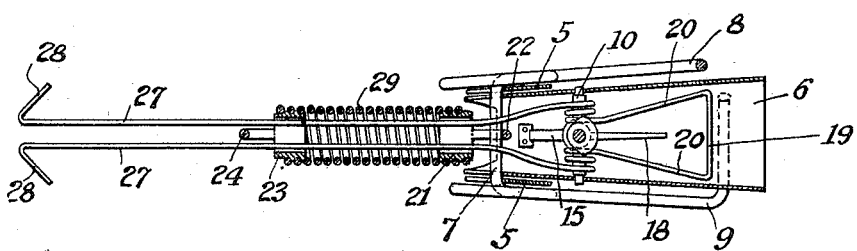
Figure 5:
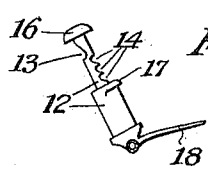
Figure 4:
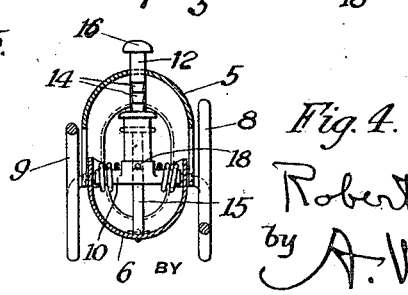

In the drawings:—Figure 1 is a side elevation of my improved animal trap, showing the trap in the open position. Fig. 2 is a view similar to Fig. 1, showing the trap in the closed position. Fig. 3 is a horizontal section, on line 3—3 of Fig. 1. Fig. 4 is a transverse section, on line 4—4 of Fig. 1. Fig. 5 is a view of the tripping device removed from the trap.

2 designates a pair of jaws comprising an upper jaw 5 having a top and side walls, and a lower jaw 6 having a bottom and side walls. The jaws 5 and 6 are pivotally connected together as at 7, and they are movable toward and from each other on the pivot 7, the side walls of the upper jaw 7 being arranged outwardly of and overlapping the side walls of the lower jaw 5. The upper jaw 5 is forced toward the lower jaw 6 by a spring 8 bearing upon the top of the upper jaw 5, and the lower jaw 6 is forced toward the upper jaw 5 by a spring 9 bearing against the bottom of the lower jaw 6. The springs 8 and 9 and the pivot pin 7 for the jaws are formed of a single piece of spring wire which extends through the jaws 5 and 6 to form the pivot pin 7 and is then bent to form the two springs 8 and 9 as shown. It will thus be seen that the jaws 5 and 6 may be opened to the position shown in Fig. 1, against the action of the springs 8 and 9, and that the jaws 5 and 6 may be closed by the action of the springs 8 and 9, as shown in Fig. 2. The jaws 5 and 6 are adapted to be held in the open position as shown in Fig. 1, by a suitable tripping device, which, when tripped, will permit the springs 8 and 9 to close the jaws as shown in Fig. 2; and I shall now proceed to describe the tripping device.

Extending transversely through the lower jaw 6 and into the side walls thereof, is a pivot pin 10. Extending upwardly from the pivot pin 10 and through an opening 11 in the top of the upper jaw 5 is a latch arm 12. The rearward side of the latch arm 12 is provided with a notch 13 which is adapted to engage the top of the upper jaw 5 as shown in Fig. 1, to hold the jaws in the open position against the action of the springs 8 and 9. The forward side of the latch arm 12 is provided with a series of notches 14, which are adapted to engage the top of the upper jaw 5 to prevent the opening of the jaws, as will be presently explained. The latch arm 12 is pressed forward by a spring 15, the lower end of which is secured to the bottom of the lower jaw 6 and the upper end of which bears against the arm 12. It will thus be seen that when the jaws 5 and 6 are opened against the springs 8 and 9, and the notch 13 of the latch arm 12 is engaged with the top of the upper jaw 5, the jaws 5 and 6 will be retained in the open position by the latch arm 12, the engagement of the notch 13 with the top of the upper jaw 5 preventing the spring 15 from moving the latch arm forwardly to disengage the notch 13 from the rearward wall of the opening 11. When, however, the notch 13 is disengaged from the rearward wall of the opening 11 by the operation of the tripping device hereinafter described, the springs 8 and 9 will quickly close the jaws 5 and 6, and the spring 15 will move the latch arm 12 forwardly and engage the forward notches 14 thereof with the forward wall of the opening 11, thus preventing the opening of the jaws 5 and 6 until the latch arm 12 be moved rearwardly about the axis of the pin 10 to free the notches 14 from the forward wall of the opening 11 to permit the opening of the jaws.

The top of the latch arm 12 is provided with a suitable head 16 adapted to engage the top of the upper jaw 5 and limit the movement of the jaws 5 and 6 in a direction away from each other. The latch arm 12 is also provided with a suitable shoulder 17, which is adapted to engage the top of the upper jaw 5 and limit the movement of the jaws 5 and 6 toward each other.

Projecting forwardly from the latch arm 12, and located centrally within the jaws 5 and 6, is a bait-receiving member 18, adapted to receive bait to attract an animal to the trap. Arranged directly in advance of the bait-receiving member 18 is a transversely-arranged, horizontal bar 19, which, in the present instance is supported by arms 20 projecting forwardly from the pivot pin 10. The bar 19 and arms 20 are formed of a single piece of wire, and bent and coiled about the pivot pin 10 laterally of the latch arm 12, as shown.

Extending from the rearward end of the pair of jaws 2 is a coiled spring 29, one end of which is secured to a collar 21 provided with a hook 22 which is engaged with the pivot pin 7. Secured to the other end of the spring 29, is a collar 23 provided with a ring 24 to which is attached one end of a chain 25. The other end of the chain 25 may be attached to a suitable stake 26 driven into the ground, or it may be attached to any other suitable fixed object.

The wire forming the bar 19 and arms 20, after being coiled about the pivot pin 10, is extended rearwardly through the collars 21 and 23 and spring 29, and forms two rods 27 which extend beyond the outer end of the spring 29 and are provided with lateral projections 28, which, when the spring 29 is drawn outwardly from the jaws 2 are adapted to engage the collar 23 and limit the outward movement of the outward end of the spring 29, for a purpose hereinafter explained.

I shall now proceed to describe the operation of my improved trap.

Suitable bait is applied to the bait-receiving member 18, the jaws 5 and 6 are opened against the springs 8 and 9, and the notch 13 of the latch arm 12 is engaged with the rearward wall of the opening 11 in the top of the upper jaw 5, which holds the trap in set position with its jaws open. The chain 25 is then secured to any convenient fixed object, such as the stake 26. The trap now is in condition to receive the animal for which it is set, and in this set position of the trap the bait carried by the member 18 is directly in rear of the bar 19 within the trap. The animal seeking the bait within the trap opens its mouth and closes its jaws upon the bait carried by the member 18, and at the same time closes its jaws upon the bar 19 which is located directly in advance of the bait carried by the member 18. As the animal closes its jaws upon the bait carried by the member 18, and attempts to remove the bait therefrom, the member 18 will rock the latch arm 12 on the axis of the pivot 10 and disengage the notch 13 from the rearward wall of the opening 11, thus freeing the upper jaw 5 and permitting the springs 8 and 9 to close the jaws 5 and 6 upon the jaws of the animal. The pressure of the jaws 5 and 6 upon the jaws of the animal prevents the animal from opening its jaws, and the front teeth of the animal, being located inwardly of the bar 19, are engaged by said bar in a manner to prevent the animal from freeing itself from the trap. The animal is thus retained by the trap until the jaws 5 and 6 are opened to permit the jaws of the animal to open and the bar 19 to pass out of the animal's mouth between its upper and lower front teeth. After the jaws 5 and 6 have been closed upon the jaws of the animal as just described, the spring 15 tends to move the latch arm 12 forwardly and the notches 14 into engagement with the forward wall of the opening 11 to prevent any liability of the animal opening the jaws 5 and 6 and thereby freeing itself from the trap. Should the animal attempt to free itself from the trap after being caught thereby, by a pulling action upon the bar 19, the spring 29 forming a part of the connection between the trap and stake 28 will yield and prevent the animal from injuring itself or breaking its teeth upon the bar 19. The lateral projections 28 on the rods 27 serve as a means to limit the movement of the trap against the action of the spring 20.

While I have herein shown and described my invention in a desirable and practicable form, I desire it to be understood that I do not limit myself to this particular construction, as the same may be greatly modified without departing from my invention.

I claim:—

1. In an animal trap, the combination of a pair of jaws movable toward and from each other; a spring tending to move said jaws toward each other; a tripping device for holding said jaws open against the action of said spring, said tripping device including a bait-receiving member; and a bar located between said jaws in advance of the bait-receiving member and adapted to engage the front teeth of an animal, said jaws being movable independently of said bar.

2. In an animal trap, the combination of a pair of jaws movable toward and from each other; a spring tending to move said jaws toward each other; a latch arm pivoted to one jaw and provided with means for holding said jaws open against the action of said spring, and provided also with means to prevent movement of said jaws away from each other when the first named means is inactive; a bait receiving member connected to said latch arm; and a bar located between said jaws in advance of the bait receiving member and adapted to engage the front teeth of an animal.

3. In an animal trap, the combination of a pair of jaws pivotally connected together and movable toward and from each other; a spring tending to move said jaws toward each other; a tripping device for holding said jaws open against the action of said spring, said tripping device including a bait-receiving member; and a bar located between said jaws in advance of the bait-receiving member and adapted to engage the front teeth of an animal, said jaws being movable independently of said bar.

4. In an animal trap, the combination of a pair of jaws movable toward and from each other and comprising an upper jaw having a top and side walls and a lower jaw having a bottom and side walls, the inner faces of the walls of said jaws being sufficiently smooth and unobstructed to prevent injury to an animal when closed upon the same; a spring tending to move said jaws toward each other; a tripping device for holding the jaws against the action of said spring, said tripping device including a bait receiving member; and a bar located between said jaws in advance of the bait receiving member and adapted to engage the front teeth of an animal.

5. In an animal trap, the combination of a pair of jaws movable toward and from each other and comprising an upper jaw having a top and side walls and a lower jaw having a bottom and side walls overlapping the side walls of the upper jaw, the inner faces of the walls of said jaws being sufficiently smooth and unobstructed to prevent injury to an animal when closed upon the same; a spring tending to move said jaws toward each other; a tripping device for holding the jaws against the action of said spring, said tripping device including a bait receiving member; and a bar located between said jaws in advance of the bait receiving member and adapted to engage the front teeth of an animal.

6. In an animal trap, the combination of a pair of jaws movable toward and from each other; a spring tending to move said jaws toward each other; a pivot pin carried by one jaw; a latch arm carried by said pin and extending through an opening in the other jaw, said arm having a notch on one side thereof adapted to engage the last named jaw and hold said jaws open against the action of said spring, and a series of notches on the other side thereof adapted to engage said last named jaw to prevent the opening of said jaws; a spring tending to move said series of notches into engagement with said last named jaw; a bait-receiving member connected to said latch arm; and a bar located between said jaws in advance of the bait-receiving member and adapted to engage the front teeth of an animal.

In testimony whereof I affix my signature in presence of two witnesses.

ROBERT E. RIDAY.

Witnesses:
ELLA M. WARE,
S. I. HARPER.